United States Patent [19]
Radmall

[11] Patent Number: 5,924,551
[45] Date of Patent: Jul. 20, 1999

[54] CONVEYORS

[75] Inventor: Paul Radmall, Gloucestershire, United Kingdom

[73] Assignee: Rako Products Limited, United Kingdom

[21] Appl. No.: 08/737,291

[22] PCT Filed: May 9, 1995

[86] PCT No.: PCT/GB95/01044

§ 371 Date: Nov. 8, 1996

§ 102(e) Date: Nov. 8, 1996

[87] PCT Pub. No.: WO95/30610

PCT Pub. Date: Nov. 16, 1995

[30] Foreign Application Priority Data

May 9, 1994 [GB] United Kingdom .................... 9409143

[51] Int. Cl.$^6$ .................................................. B65G 21/02
[52] U.S. Cl. .................................... 198/861.1; 198/861.5; 198/626.5
[58] Field of Search .................................... 198/604, 606, 198/607, 620, 626.1, 626.5, 626.6, 841, 860.2, 861.1, 861.5, 860.1

[56] References Cited

U.S. PATENT DOCUMENTS

| | | |
|---|---|---|
| 3,581,876 | 6/1971 | Keith . |
| 3,978,971 | 9/1976 | Lonrow et al. .................. 198/626.1 X |
| 4,013,167 | 3/1977 | Bourgeois ............................ 198/860.2 |
| 4,036,355 | 7/1977 | Valli ........................................ 198/607 |
| 4,203,314 | 5/1980 | Vandlik et al. .................. 198/861.5 X |
| 4,382,471 | 5/1983 | Peterson . |
| 4,650,067 | 3/1987 | Brule . |
| 4,798,281 | 1/1989 | Egger ............................... 198/626.5 X |
| 5,131,531 | 7/1992 | Chambers ............................. 198/860.2 |
| 5,178,263 | 1/1993 | Kempen . |
| 5,186,310 | 2/1993 | Winchester . |
| 5,435,433 | 7/1995 | Jordan et al. ......................... 198/626.5 |

FOREIGN PATENT DOCUMENTS

| | | |
|---|---|---|
| 0174828 | 3/1986 | European Pat. Off. . |
| 0275564 | 7/1988 | European Pat. Off. . |
| 0457904 | 11/1991 | European Pat. Off. . |
| 787174 | 9/1935 | France ................................. 198/626.1 |
| 2285317 | 4/1976 | France . |
| 2387873 | 11/1978 | France . |
| 449391 | 9/1927 | Germany ............................ 198/626.1 |
| 196609 | 5/1967 | U.S.S.R. .............................. 198/860.2 |
| 377524 | 6/1973 | U.S.S.R. .............................. 198/860.2 |
| 1264231 | 6/1969 | United Kingdom . |
| 1391254 | 4/1975 | United Kingdom . |
| 2219780 | 5/1988 | United Kingdom . |

*Primary Examiner*—James R. Bidwell
*Attorney, Agent, or Firm*—Baker & Botts, L.L.P.

[57] ABSTRACT

A conveyor comprising a pair of conveyor units each comprising a frame supporting a roller at each end over which a conveyor belt passes as a continuous loop in a channel defined by side walls of the frame, characterised in that the frames (3) of the two conveyor units (1,2) are connected together with respective runs of the conveyor belts (5) opposed face-to-face so that they and the respective side walls (6) along both sides define an enclosed conveying channel (8), at least one roller (4) of the frames (3) being driven by a motor (10) so that the opposed runs of the conveyor belts (5) move in the same direction to convey material therebetween, and a plurality of projections (15) are provided across the surfaces of the conveyor belts (5) so as to engage and support material vertically within the conveying channel (9).

4 Claims, 2 Drawing Sheets

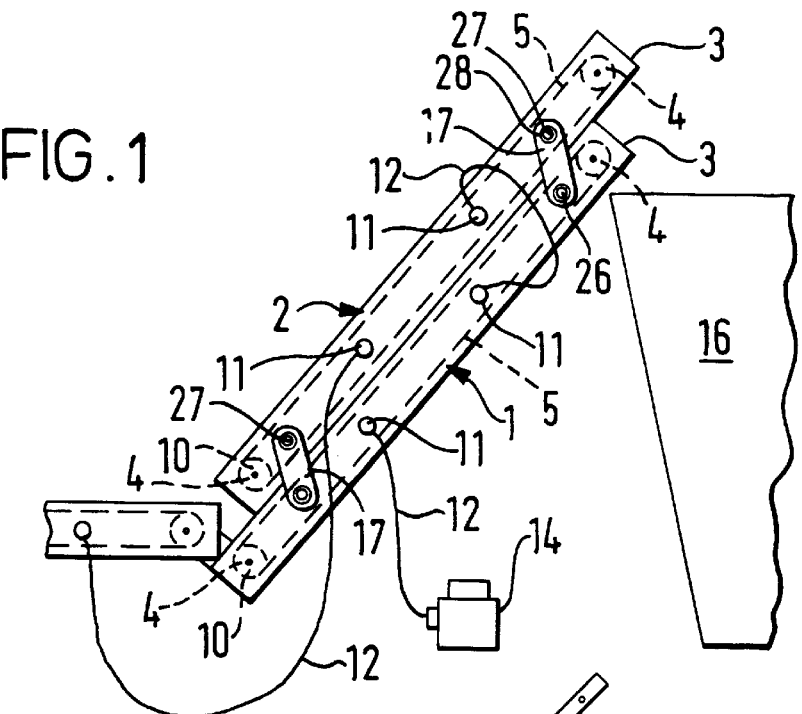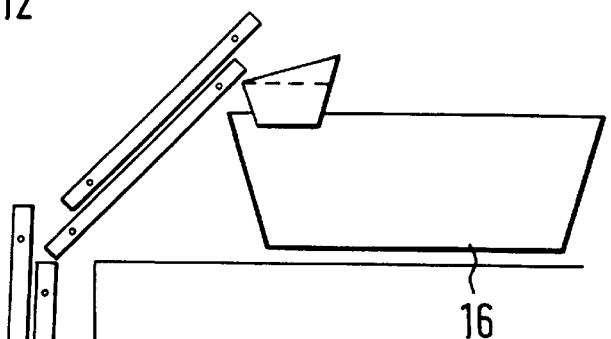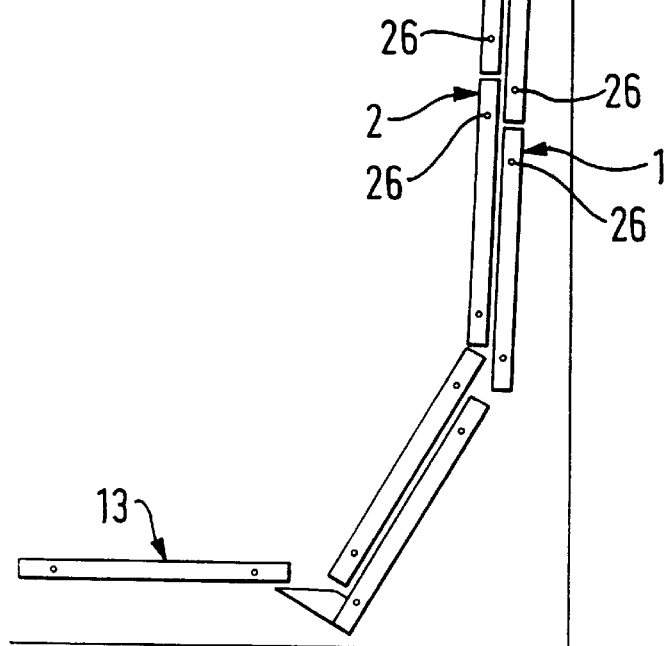

CONVEYORS

TECHNICAL FIELD

This invention relates to a belt-type continuous conveyor and a conveying system comprising a plurality of similar conveyors.

It is usual practice with all small scale building work, both professional and DIY, to move materials around in buckets and wheel barrows, even though this is laborious, slow and sometimes inconvenient. It is also known to use dump trucks and cranes, but these are not always practical or convenient.

However, GB2271543-A discloses a rigid and lightweight conveyor unit which can be easily handled on site to suit any particular application. This conveyor unit comprises a frame supporting a roller at each end over which a conveyor belt passes in a continuous loop, and one of which is driven by a motor. The frame comprises a box-section structure with upright side walls and lateral upper and lower bed plates over and along which the conveyor belt slides in use. The box-section frame is filled with a rigid structural foam that increases the strength of the structure and serves to encapsulate the power circuit components within the frame. The side walls themselves incorporate longitudinally extending box sections to increase their strength and provide guide rails or feet top and bottom. Furthermore, the side walls extend beyond the bed plates so as to form channels top and bottom in which the conveyor belt runs between the rollers.

DISCLOSURE OF THE INVENTION

One object of the present invention is to provide an improved conveyor unit, and another object is to provide a conveyor unit which is especially adapted to convey material upwards at a steep angle or vertically.

According to one aspect, the invention consists in a pair of conveyor units each comprising a frame supporting a roller at each end over which a conveyor belt passes as a continuous loop in a channel defined by side walls of the frame, the frames of the two conveyor units being connected together with respective runs of the conveyor belts opposed face-to-face so that they and the respective side walls along both sides define an enclosed conveying channel, at least one roller of the frames being driven by a motor so that the opposed runs of the conveyor belts move in the same direction to convey material therebetween, and a plurality of projections being provided across the surfaces of the conveyor belts so as to engage and support material vertically within the conveying channel.

Preferably, the two conveyor units are offset longitudinally relative to one another so that one conveyor unit extends downwards beyond the lower end of the other conveyor unit and exposes the run of its conveyor belt at the lower end for the infeed of material against it. Said other conveyor unit then preferably extends upwards beyond the upper end of said one conveyor to ensure that material is discharged from this upper end on that side of the conveyor unit opposite the lower infeed. A hopper may be provided at the lower end and/or upper end to collect material handled by the conveyor units.

The projections on the face of the conveyor belt may take the form of lateral bars or ribs, or pegs or fingers depending upon the material being conveyed. In one embodiment, ribs may extend laterally across the full width of the conveyor belt. In another embodiment, pegs may be evenly distributed across the face of the conveyor belt so as to avoid any significant bunching or alignment of the pegs and to ensure that the vertical lifting action is spread as evenly as possible across the width of the conveying belts and the pick-up action at the lower input end of the conveying channel occurs at a substantially even rate.

The height of the projections above the face of the conveyor belt is selected to give the required vertical lifting action. This height may be selected to avoid overlap or interference between the projections on the runs of the conveyor belts either side of the conveying channel. Alternatively, in some applications it may be preferred that the projections overlap in height so as to better handle particular materials.

Preferably, the projections are resilient so as to deflect or deform when engaging solid objects in the conveying channel.

It will be appreciated that a conveyor unit according to the invention can be readily assembled on site using two standard conveyor units, such as shown in GB2271543-A, which would otherwise be used as single conveyor units. Once fitted with special conveyor belts having the projections on them, these units can be easily connected together one on top of the other using standard fasteners or special side plates adapted to produce a predetermined offset of the two conveyors longitudinally relative to one another. The side plates may secure the two conveyor units rigidly together at a fixed spacing between the conveyor belts. Alternatively, however, the side plates may be pivotally fastened between the conveyor units so that they swing together under the effect of their weight when in use, and can move apart to accommodate larger accumulations or pieces of material between the conveyor belts. Each conveyor unit may incorporate transverse holes extending between the side walls to receive scaffold poles about which the side plates can be pivoted.

Furthermore, it will be appreciated that two or more conveyor units according to the invention may be used end-to-end so as to raise material through a greater vertical height, the angle of inclination of conveyor units at the infeed end and/or discharge end of the line of conveyor units being less steep so as to facilitate the infeed or discharge of material.

According to another aspect, the invention consists in a pair of similar conveyor units connected end-to-end, each conveyor unit comprising a frame supporting a roller at each end over which a conveyor belt passes in a continuous loop, the frame comprising a box-section structure with upright side walls and lateral walls including an upper bed plate over and along which the conveyor belt slides in use, an upright connector plate being fastened to the side walls of the conveyor units each side to bridge across between their adjoining ends. A double length conveyor unit can therefore be readily assembled on site from two standard conveyor units.

The conveyor belt is preferably a single belt that passes in a continuous loop over the rollers of both conveyor units. At least one roller is driven by a motor, but both rollers at opposite ends of the conveyor belt may each be driven by a separate motor.

According to yet another aspect, the invention consists in a conveyor unit comprising a frame supporting a roller at each end over which a conveyor belt passes in a continuous loop, the frame comprising a box-section structure with upright side walls and lateral walls including an upper bed plate over and along which the conveyor belt slides in use, characterised in that at least one transverse hole is provided in the conveyor unit so as to extend from one side wall to the other to receive a support pole in use.

According to yet another aspect, the invention consists in a conveyor unit comprising a frame supporting a roller at each end over which a conveyor belt passes in a continuous loop, the frame comprising a box-section structure with upright side walls and lateral walls including an upper bed plate over and along which the conveyor belt slides in use, characterised in that said lateral walls are secured to the side walls by clamp members in the form of extrusions with channels that accommodate fasteners extending through the side walls.

DESCRIPTION OF THE DRAWINGS

FIG. 1 shows a side elevation of a conveyor according to the invention for moving material upwards at a steep angle;

FIG. 3 is a side view of several conveyor units according to the invention for moving material upwards.

MODE OF CARRYING OUT THE INVENTION

Figure 2:
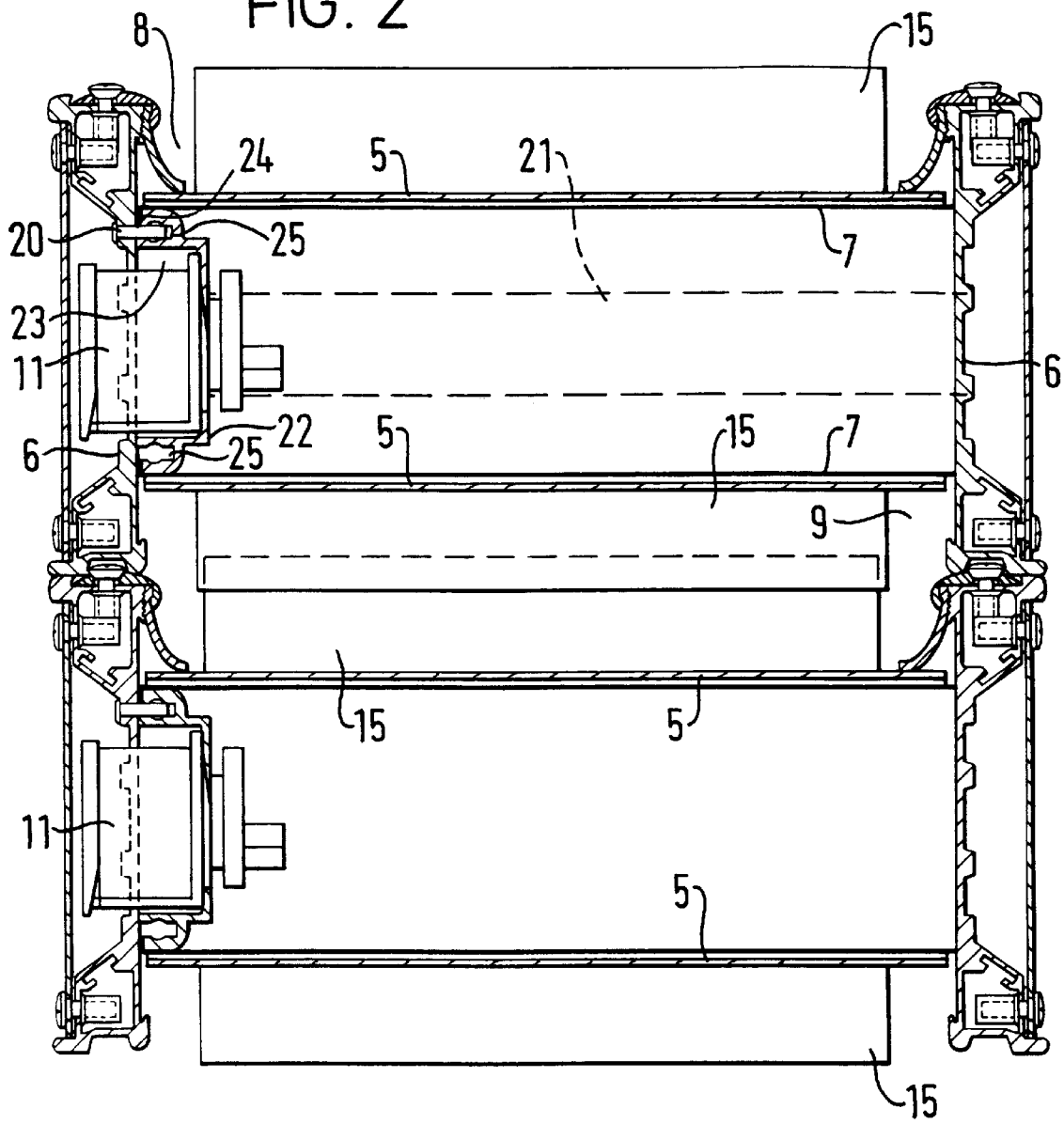
FIG. 2 is a section through the conveyor of FIG. 1.

The vertical lift conveyor illustrated in FIGS. 1 and 2 comprises a pair of conveyor units 1,2 connected together one on top of the other. Each conveyor unit comprises a frame 3 supporting a roller 4 at each end over which a conveyor belt 5 passes in a continuous loop. The frame 3 has a box-section structure, as shown in FIG. 2, comprising upright side-walls 6 joined by upper and lower lateral bed-plates 7 defining channels 8 in which the conveyor belt 5 runs over the bed-plates 7. The rollers 4 are mounted between the ends of the side walls 6 that extend beyond the bed plates 7. The conveyor units 1,2 are connected together by a pair of connector plates 17 at each side which hold the side walls 6 of the respective conveyor units in vertical alignment so that the side walls 6 and the runs of the conveyor belts 5 between the conveyor units define a conveying channel 9.

Each connector plate 17 is pivotally connected at its ends to a respective conveyor unit 1,2, and all four connector plates 17 extend generally parallel to one another so that the conveyor units 1,2 can move towards and away from one another guided by a swinging action of the connector plates.

If the upper conveyor unit 2 is supported at a fixed inclination, the lower conveyor unit 1 is supported on the connector plates 17 so that it swings inwards, under the effect of gravity, against the lower edges of the upper conveyor unit 2. If the lower conveyor unit 1 is supported at a fixed inclination, the upper conveyor unit 2 is supported on the connector plates 17 so that it swings inwards, under the effect of gravity, against the upper edges of the lower conveyor unit 1. The inclination of the connector plates 17 and conveyor units 1,2 are selected relative to one another so as to produce the required inwards swinging action. In FIG. 1, the lower conveyor unit 1 swings inwards beneath the upper conveyor unit 2 so the connector plates are inclined as shown to achieve this effect.

The pivotal connections between the ends of the connector plates 17 and the conveyor units 1,2 are provided by support poles 26 which are received in transverse holes 21 that extend from one side wall 6 to the other and engage holes 27 in the connector plates 17. These support poles 26 may conveniently be scaffold poles which can be supported at their ends in a conventional scaffold structure. The holes 27 in the connector plate 17 are preferably provided with collars 28 to form bearings on the poles 26.

In an alternative embodiment of the invention, the connector plates 17 may, however, be formed with plugs at their ends which rotatably engage holes in the side walls 6 of the conveyor units 1,2.

An electric motor and gearbox 10 are totally enclosed and sealed within the body of one roller 4, for example, the lower roller of each conveyor 1,2 as shown in FIG. 1, and are connected in a power circuit via electric sockets 11 and interconnecting power cables 12 so that the motors move the adjacent runs of the conveyor belts 5 in the same upward direction.

The electrical system of each of the conveyor units 1,2 may be generally similar to that of the conveyor units of GB2271543-A, which allows the drive direction of the motor to be reversed by switching over the connections of the cables 12 to the two sockets 11 of each conveyor unit. Thus, in this arrangement the inter-connection between sockets 11 of the two conveyor units 1,2 has to be selected appropriately. The other sockets 11 may each be connected to another conveyor unit 13 or a power supply 14, as shown in FIG. 1.

The conveyor belts 5 are each provided with a plurality of projections 15 on its outer face in the form of resilient ribs which extend across the width of the belt and are spaced regularly along its length so as to give an evenly distributed vertical lifting action as the ribs engage material fed into the bottom of the conveying channel 9. The ribs 15 may be solid or hollow to further assist deformation when engaging lumps of material being conveyed. These ribs 15 are of such a height that they slightly overlap the ribs 15 on the run of the conveyor belt opposite.

The two conveyor units 1,2 are of the same length but are connected together so that they are offset longitudinally relative to one another with the lower conveyor unit 1 extending downwards beyond the lower end of the upper conveyor unit 2, and the upper conveyor unit 2 extending upwards beyond the end of the lower conveyor unit 1. This arrangement exposes the run of the lower conveyor belt 5 at the lower end of the conveyor so that the conveyor unit 13 can feed material against it to facilitate the infeed of material to the conveying channel between the conveyor belts. Also, the overhang of the upper conveyor belt at the upper end ensures that the material is discharged away from the infeed conveyor unit 13 and into a bin 16.

It is possible to employ two or more vertical conveyor units instead of just the one in FIG. 1, so as to convey material through a greater height, these conveyor units being arranged end-to-end, as shown in FIG. 3, with the respective projecting ends of the conveyor units 1 and 2 overlapping so that a minimum gap is left between successive conveyor units and material is transferred between them with minimum spillage.

If required, special shields may be fitted between successive conveyor units and/or at the infeed or discharge ends of the conveyor units. Also, if required, hoppers can be fitted to the infeed and discharge ends of the conveyor units.

The conveyor units 1,2 could each be of the same general construction as the conveyor unit disclosed in GB2271543-A, however, this construction is improved as shown in FIG. 2 by forming each side wall 6 as a one-piece aluminium extrusion.

Figure 4:
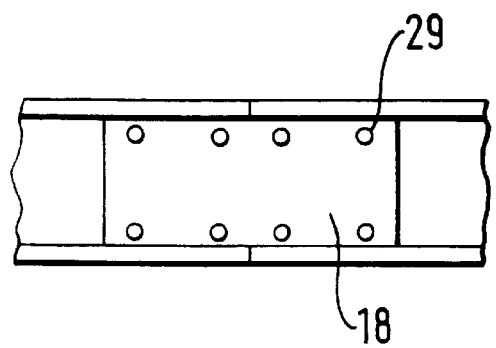
FIG. 4 is a side view of two conveyor units according to the invention connected end-to-end.

Two conveyor units 1,2 may be connected end-to-end, as shown in FIG. 4, using connector plates 18. One plate 18 each side, bridges across between the adjoining ends of the side walls 6 of the conveyor units 1,2 and are secured to the side walls by fasteners 29. The side walls 6 then effectively become extensions of one another along each side and provide increased strength and rigidity to a double length conveyor unit. A double length conveyor belt 5 can then be looped around the rollers 4 of both conveyor units.

An additional aluminium extrusion 22 is provided along the inside of the one side wall 6 to which the sockets 11 are to be connected, and this is formed with a channel 23 to receive the sockets 11, as shown in FIG. 2. Furthermore, this extrusion 22 may be used to clamp the adjacent ends of the bed plates 7 in place against the inside surface of the side wall 6 by turning the flanges 24 of the bed plates 7 inwards and locating them between the two extrusions 6,22 before fastening them together with pop rivets 20. Short lengths of the same cross-section extrusion 22 may also be used in a similar way to clamp the other ends of the bed plates 7 against the inside of the opposite side wall 6.

Channels 25 may also be formed in the side walls 6 and/or extrusion 22 to accommodate fasteners 20, in the form of pop rivets or the like, which are inserted into the channel and expanded radially to grip within it. This has the advantage that the fasteners can be fitted anywhere along the length of the side walls as required during assembly of the conveyor unit, thus avoiding the need to provide holes in predetermined positions.

I claim:

1. A conveyor unit comprising a frame supporting a roller at each end over which a conveyor belt passes in a continuous loop, wherein the frame comprises a box-section structure with upright side walls and lateral walls including an upper bed plate over and along which the conveyor belt slides characterized in that at least one transverse hole is provided in the conveyor unit so as to extend unobstructed through the frame from one side wall to the other to receive a support pole by which the conveyor unit as a whole is supported in space.

2. A conveyor unit as claimed in claim 1 in which at least two of said transverse holes are provided in the conveyor unit, each equidistant from a respective adjacent end of the conveyor unit.

3. A conveyor assembly comprising at least one belt-type continuous conveyor units each having a frame with side walls, lateral walls and at least one transverse hole extending unobstructed through the frame from one side wall to the other, at least one of said transverse holes having a support pole inserted therein to support the conveyor unit vertically.

4. The conveyor assembly according to claim 3, wherein the support pole is a component of a scaffold structure which supports the conveyor assembly.

\* \* \* \* \*